Figure 1:
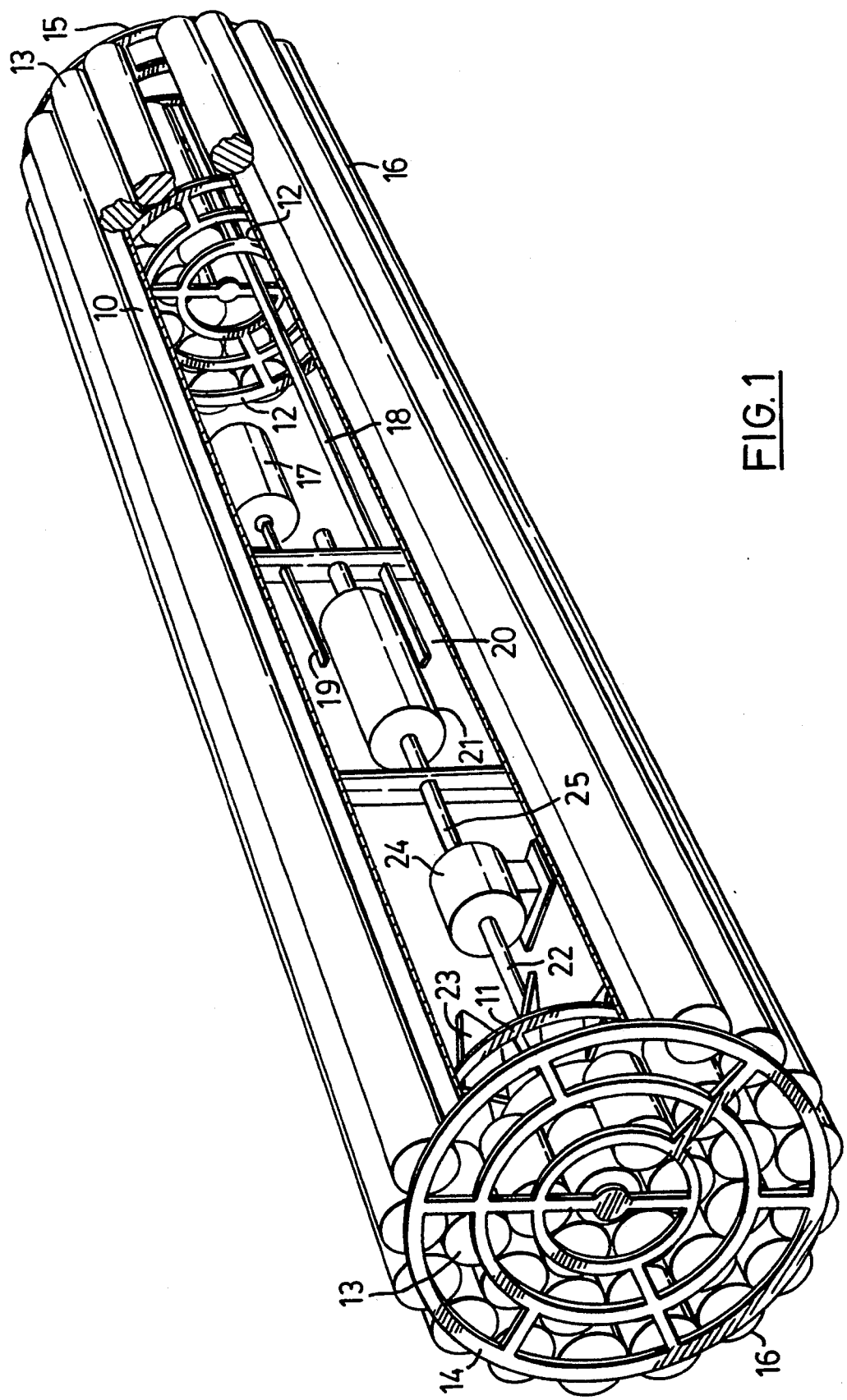

United States Patent

Flaman

Patent Number: 5,365,554
Date of Patent: Nov. 15, 1994

[54] INSTRUMENTATION PROBE

[76] Inventor: Michael T. Flaman, 20 Treeline Court, Etobicoke, Ontario, Canada, M9C 1K8

[21] Appl. No.: 948,443

[22] Filed: Sep. 22, 1992

[51] Int. Cl.$^5$ ............................................. G21C 17/00
[52] U.S. Cl. ..................................... 376/245; 376/247
[58] Field of Search ............... 376/245, 247, 256, 254; 73/660, 661, 665; 976/DIG. 221

[56] References Cited

U.S. PATENT DOCUMENTS

| | | | |
|---|---|---|---|
| 336,668 | 2/1886 | Shedlock | 346/138 |
| 3,808,601 | 4/1974 | Kolb et al. | 346/33 |
| 3,927,369 | 12/1975 | Billeter et al. | 324/58.5 C |
| 3,939,406 | 2/1976 | Billeter et al. | 324/58.5 C |
| 3,940,996 | 3/1976 | Lauhoff et al. | 73/4.32 R |
| 4,181,028 | 1/1980 | Talbott, Jr. | 73/665 |
| 4,196,613 | 4/1980 | Cole | 73/32 R |
| 4,303,926 | 12/1981 | Drake et al. | 346/68 |
| 4,307,405 | 12/1981 | Rosean | 345/121 |
| 4,345,480 | 8/1982 | Basham et al. | 73/861.77 |
| 4,711,753 | 8/1982 | Impink, Jr. et al. | 376/216 |
| 4,735,100 | 4/1988 | Hajto | 73/861.66 |
| 4,739,653 | 4/1988 | Kathel | 73/151 |
| 4,960,561 | 10/1990 | Gerard et al. | 376/352 |

OTHER PUBLICATIONS

The Determination of Time Constants of Reactor Pressure and Temperature Sensors: The Dynamic Data System Method by S. M. Wu, M. C. Hsu, and M. C. Chow pp. (84–96) Oct. 1979.

*Primary Examiner*—Donald P. Walsh
*Assistant Examiner*—Meena Chelliah

[57] ABSTRACT

An instrumentation probe for measuring and recording one or more physical parameters within a fluid duct, such as a nuclear reactor fuel channel, comprises one or more sensors responsive to the parameters to be measured and recorded, each sensor actuating a scribe which cooperates with a recording chart. The recording chart is a drum, disc, tape or like recording device, and is volume driven at a constant speed by an impeller responsive to the fluid flow. No connections to external instrumentation are required.

6 Claims, 1 Drawing Sheet

INSTRUMENTATION PROBE

The present invention relates to an instrumentation probe for use in the on-line measurement and recording of physical parameters within a fluid duct without connection to external instrumentation. A particular application of the instrumentation probe is to the measurement and recording of structural, thermal and hydraulic data within a fuel channel of a fluid-cooled nuclear reactor, and such data may include fuel channel coolant pressure, in-channel flow magnitudes and variations, fluid and pressure tube temperatures, pressure tube vibration, fuel bundle displacements, and the like. However, the invention is not exclusively concerned with nuclear applications, but is applicable to analogous systems in which physical parameters within a fluid duct are to be measured and recorded.

In the case of fluid-cooled nuclear reactors, problems associated with fuel bundle damage have underlined the need to have a capability to obtain accurate measurement data directly from within any fuel channel during any phase of reactor operation. The inability to obtain structural integrity measurement data directly from locations within fuel channels during reactor operation has resulted in uncertainty as to quantifying activity within the fuel channels, such activity relating more particularly to the pressure tubes, coolant flow and fuel bundles. This uncertainty has in turn resulted in severe information constraints regarding structural and thermal-hydraulic concerns with fuel channels. In order to deal with these concerns, accurate on-line measurements within the fuel channels are required.

According to the present invention, there is provided an instrumentation probe for measuring and recording one or more physical parameters within a fluid duct, which may be a fuel channel of a nuclear reactor, although the invention in its broadest aspect is not limited to nuclear applications. The instrumentation probe basically comprises an elongate support frame adapted to be located within the fluid duct, and self-contained measuring and recording means mounted on the frame. The self-contained measuring and recording means comprises one or more sensors each responsive to a physical parameter to be measured and recorded, and a scribe coupled to the or each sensor, which scribe cooperates with a volume driven recording chart, such as a rotary drum, disk or tape for recording variations in the respective physical parameter over time. The recording chart is driven by a longitudinally extending rotary shaft carrying an impeller which is responsive to fluid flow for rotating the shaft at a constant speed, the shaft being coupled to the recording chart through a speed reducing mechanism.

In the case of a nuclear reactor application the fluid flow is itself maintained constant and so the constant speed of the recording chart is thereby maintained. In applications where the fluid flow is not constant it is necessary to govern the shaft rotation by any suitable speed governing device, or alternatively to apply signal reference markings to the recording chart at regular intervals of time during monitoring periods so as to provide a time scale. It will be appreciated that, in the latter case, the chart will be driven at a measurable speed since the speed can be later deduced from the known time periods between the applied reference markings.

In order that the invention may be readily understood, a preferred embodiment thereof will now be described with reference to the single FIGURE of the accompanying drawing. The drawing shows a perspective view, partly broken away to show internal parts, of an instrumentation probe for use in the on-line measurement and recording of physical parameters within a nuclear reactor fuel channel.

The probe comprises a cage-like inner support structure 10 which houses and supports the instrumentation of the probe. The support structure 10 is attached to a pair of inner perforate end plates 11, 12 with an array of dummy fuel pencil stubs 13 which are attached to actual fuel bundle end plates 14, 15. The outer periphery of the probe consists of an array of active fuel pencils 16 extending longitudinally between the end plates 14, 15 and connected thereto at their ends. Thus the probe can be configured to simulate a fuel bundle of the reactor in which it is to be used.

The instrumentation includes sensors each of which is responsive to a physical parameter to be measured. In the illustrated device there is a mechanical pressure sensor 17 responsive to fluid pressure and an end plate displacement sensor 18, the latter being in the form of a rod which is connected to the end plate 15 and extends longitudinally therefrom. The instrumentation may include other sensors (not shown), each being responsive to a respective physical parameter to be recorded. Each sensor carries a scribe 19, 20, or equivalent writing device which cooperates with a recording device for recording the measurements of the parameters over time. In the illustrated embodiment of the invention the recording device is a rotary drum 21, but it may take any other suitable form such as a rotary disc or a travelling tape.

The drum 21 is driven at a constant speed to provide a time base. As shown, the device for rotating the drum 21 comprises a rotary shaft 22 carrying an impeller 23 which is responsive to the fluid flow along the fuel channel so as to rotate the shaft 22. The shaft 22 serves as the input shaft of a speed reducing mechanism 24, the latter having an output shaft 25 on which the rotary drum 21 is mounted. Since the fluid flow in the reactor fuel channel is normally held constant, the drum 21 is rotated at a constant speed. In certain applications, however, where the fluid flow may not be constant, the speed of the drum can be kept constant simply by governing the speed of the impeller to the speed corresponding to the lowest flow rate expected.

In order to clarify the structure of the probe and to show essential components, certain elements have been omitted from the drawing. In particular, a part of the inner and outer rings of fuel pencils has been omitted to reveal the instrumentation. The sensors, scribes, recording drum and gear reducing mechanism are conventional, and are supported within the cage-like support structure. The drum 21 and the speed reducing mechanism 24, which may be a gear reduction train, are arranged coaxially within the cage, one end of the rotary shaft 22 being journalled in a bearing mounted centrally on the end plate 11.

I claim:

1. An instrumentation probe for use in the on-line measurement and recording of one or more physical parameters within a nuclear reactor fuel channel, without connection to external instrumentation, said instrumentation probe comprising:

an elongate support frame for being mounted within the fuel channel, and measuring and recording means mounted on the frame, said measuring and recording means comprising at least one sensor responsive to a physical parameter to be measured and recorded, scribe means coupled to said at least one sensor for recording a measurement of said physical parameter, a volume driven recording chart, and means for driving the recording chart comprising a longitudinally extending rotary shaft carrying an impeller responsive to fluid flow through the fuel channel for rotating the shaft at a constant speed, said shaft being coupled to the recording chart through a speed reducing mechanism for driving the shaft at said constant speed, wherein said scribe and said recording chart are mounted in said frame such that said scribe records variations in said physical parameter over time on said recording chart.

2. An instrumentation probe according to claim 1, wherein the speed reducing mechanism is a gear reduction train having an input shaft and an output shaft, the recording chart comprising a rotary drum mounted on the output shaft.

3. An instrumentation probe according to claim 1, wherein the support frame is configured as a cylindrical cage having perforate end plates.

4. An instrumentation probe according to claim 3, wherein the support frame is configured to simulate a fuel bundle of the reactor.

5. An instrumentation probe according to claim 4, wherein the cylindrical cage comprises an array of fuel pencils extending longitudinally between the end plates, the array of fuel pencils being distributed symmetrically around a longitudinal axis and defining an axially extending internal space wherein said measuring and recording means are mounted.

6. An instrumentation probe according to claim 5, wherein at least some of the fuel pencils are dummy pencils.

* * * * *